(12) United States Patent
Isoo

(10) Patent No.: US 7,916,188 B2
(45) Date of Patent: Mar. 29, 2011

(54) CORRECTION APPROXIMATING STRAIGHT LINE GROUP INFORMATION GENERATING METHOD OF MULTI-DIVIDED READING CCD, AND CORRECTION PROCESSING DEVICE MANUFACTURING METHOD OF MULTI-DIVIDED READING CCD

(75) Inventor: Akihiro Isoo, Yaita (JP)

(73) Assignee: Sharp Kabushiki Kaisha, Osaka (JP)

( * ) Notice: Subject to any disclaimer, the term of this patent is extended or adjusted under 35 U.S.C. 154(b) by 923 days.

(21) Appl. No.: 11/721,328

(22) PCT Filed: Jul. 15, 2005

(86) PCT No.: PCT/JP2005/013132
§ 371 (c)(1),
(2), (4) Date: Jun. 8, 2007

(87) PCT Pub. No.: WO2006/061923
PCT Pub. Date: Jun. 15, 2006

(65) Prior Publication Data
US 2009/0231471 A1 Sep. 17, 2009

(30) Foreign Application Priority Data
Dec. 8, 2004 (JP) ................................. 2004-355278

(51) Int. Cl.
*H04N 5/217* (2011.01)
(52) U.S. Cl. ....................................................... 348/241
(58) Field of Classification Search .................. None
See application file for complete search history.

(56) References Cited

U.S. PATENT DOCUMENTS

| 5,969,759 | A | * | 10/1999 | Morimoto | 348/294 |
|---|---|---|---|---|---|
| 6,023,533 | A | * | 2/2000 | Sano et al. | 382/274 |
| 6,985,182 | B1 | * | 1/2006 | Morinaka et al. | 348/311 |
| 7,050,099 | B2 | * | 5/2006 | Takakura et al. | 348/294 |

FOREIGN PATENT DOCUMENTS

| JP | 2002-185971 A | 6/2002 |
|---|---|---|
| JP | 2002-320142 A | 10/2002 |
| JP | 2003-9162 A | 1/2003 |
| JP | 2003-101851 A | 4/2003 |
| JP | 2004-350202 A | 12/2004 |
| JP | 2004-357238 A | 12/2004 |

* cited by examiner

*Primary Examiner* — Luong T Nguyen
(74) *Attorney, Agent, or Firm* — Birch, Stewart, Kolasch & Birch, LLP

(57) ABSTRACT

To make it possible to cope with an error in a hue or the like in the case of using such a CCD of lower quality or an analog circuit of lower quality as might otherwise raise a problem in the hue, a correction approximating straight line group information creating method/apparatus of a multi-divided reading CCD and a correction processing device manufacturing method/apparatus of a multi-divided reading CCD generate correction approximating straight line group information for one real shot optimum for corrections, at an adjusting stage from a plurality of pieces of primary correction approximating straight line group information generated in advance. At the shooting time, therefore, all pixels can be corrected for their individual kinds by making use of the correction approximating straight line group information for one real shot.

2 Claims, 18 Drawing Sheets

Fig. 3

| Pixel number in CCD | Pixel type | Output value for pixel | Correction approximate straight-line group information to be used | Value for correction | Corrected value |
|---|---|---|---|---|---|
| ⋮ | | | | | |
| 10000 | C1 | a1 | f1 | +K1 | a1+K1 |
| 10001 | C2 | a2 | f2 | +K2 | a2+K2 |
| 10002 | C3 | a3 | f3 | +K3 | a3+K3 |
| 10003 | C4 | a4 | f4 | +K4 | a4+K4 |
| 10004 | C1 | a5 | f1 | +K5 | a5+K5 |
| 10005 | C2 | a6 | f2 | +K6 | a6+K6 |
| ⋮ | | | | | |

Fig. 14

| Mg + Ye (C1) | G + Cy (C2) | Mg + Ye (C1) | G + Cy (C2) | |
|---|---|---|---|---|
| G + Ye (C4) | Mg + Cy (C3) | G + Ye (C4) | Mg + Cy (C3) | |
| | | | | |

CORRECTION APPROXIMATING STRAIGHT LINE GROUP INFORMATION GENERATING METHOD OF MULTI-DIVIDED READING CCD, AND CORRECTION PROCESSING DEVICE MANUFACTURING METHOD OF MULTI-DIVIDED READING CCD

BACKGROUND OF THE INVENTION

1. Field of the Invention

The present invention relates to a method and an apparatus for generating correction approximate straight-line group information for multi-segment reading CCD, and a method and an apparatus for manufacturing correction processing equipment for multi-segment reading CCD.

2. Description of the Related Art

In recent years, CCDs used for cameras and video cameras have been provided with a large number of pixels, so that it is necessary to read the large number of pixels within a specified time. Therefore, as a high-speed reading method for a large number of pixels of CCD, a multi-segment reading method, in which all pixels of a CCD are segmented into a plurality of areas, and pixels in the segmented areas are concurrently read, has been used. In this method, a receiving unit of CCD is segmented into a plurality of blocks, and a horizontal transferring unit is also segmented, and transfers charge corresponding to each pixel. However, in this CCD, which is segmented into a plurality of blocks and outputs charge, signal paths between the blocks are different, so that the difference of output values for pixel occurs between the blocks when the segmented blocks are reconstructed into one screen. This difference mainly occurs due to the difference of physical properties between circuits. The difference is a value unique to each CCD. In addition, the difference between the segmented blocks is proportionate to the amount of light received by the light-receiving unit. Therefore, in the method disclosed in the cited document (Jpn. unexamined patent publication No. 2002-320142), by correcting gain in an amplification unit, which amplifies the output values for pixel of each block, the difference of output values for pixel occurring between blocks is corrected.

However, in the above method disclosed in the cited document (Jpn. unexamined patent publication No. 2002-320142), by means of one correction approximate straight-line group information, which is common to all pixels, the difference of output values for pixel occurring between blocks is corrected according to an amount of received light of each pixels. Therefore, in the case of using a CCD of high quality or an analog circuit of high quality, in which problems in hue etc. are hardly observed, the above method is efficient enough, but in the case of using a CCD of lower quality or an analog circuit of lower quality, in which problems in hue etc. are observed, the above method is not efficient enough to cope with the problems in hue etc. The reason for this is that each pixel of CCD has a correction property unique to pixel type.

SUMMARY OF THE INVENTION

The present invention will solve the above deficiencies. The method and an apparatus for generating correction approximate straight-line group information for multi-segment reading CCD, and a method and an apparatus for manufacturing a correction processing equipment for multi-segment reading CCD of the present invention generates a plurality of first correction approximate straight-line group information with respect to each apparatus upon adjustment. The one final correction approximate straight-line group information is generated from the generated plurality of first correction approximate straight-line group information. Therefore, for all pixels, it becomes possible to carry out correction with respect to each pixel type by means of the one final correction approximate straight-line group information upon photographing.

The first aspect of the present invention is a generating method for correction approximate straight-line group information for multi-segment reading CCD, which is for correcting an output value for pixel acquired based on an output in accordance with a pixel type of CCD, comprising a selecting step for illuminant color for correction, which selects a plurality of illuminant colors in accordance with said pixel type of CCD, an irradiating step for illuminant color for correction, which irradiates an illuminant color for correction selected in said selecting step for illuminant color for correction to said CCD, a generating step for first correction approximate straight-line group information, which generates first correction approximate straight-line group information based on the illuminant color for correction irradiated in said irradiating step for illuminant color for correction, and a generating step for final correction approximate straight-line group information, which generates one final correction approximate straight-line group information with respect to each said pixel type based on the plurality of first correction approximate straight-line group information generated in said generating step for first correction approximate straight-line group information.

The second aspect of the present invention is a manufacturing method for correction processing equipment for multi-segment reading CCD, which is for correcting an output value for pixel acquired based on an output in accordance with a pixel type of CCD, comprising a preparing step for CCD, which prepares a CCD to be corrected by the correction processing equipment, a selecting step for illuminant color for correction, which selects a plurality of illuminant colors in accordance with said pixel type of CCD, an irradiating step for illuminant color for correction, which irradiates a illuminant color for correction selected in said selecting step for illuminant color for correction to said CCD, a generating step for first correction approximate straight-line group information, which generates first correction approximate straight-line group information based on the illuminant color for correction irradiated in said irradiating step for illuminant color for correction, a generating step for final correction approximate straight-line group information, which generates one final correction approximate straight-line group information with respect to each said pixel type based on the plurality of first correction approximate straight-line group information generated in said generating step for first correction approximate straight-line group information, and a storing step, which stores the final correction approximate straight-line group information correlated with said CCD, which has been acquired in said generating step for final correction approximate straight-line group information, in a memory unit of the correction processing equipment.

According to the method and the apparatus for generating correction approximate straight-line group information for multi-segment reading CCD, and a method and an apparatus for manufacturing a correction processing equipment for multi-segment reading CCD of the present invention, it becomes possible to generate a plurality of first correction approximate straight-line group information with respect to each apparatus upon adjustment. The best one final correction approximate straight-line group information is generated from the generated plurality of first correction approximate straight-line group information. Therefore, as to all pixels, it becomes possible to carry out correction with respect to each pixel type by means of the one final correction approximate straight-line group information upon photographing.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a diagram exemplifying relation between CCD pixels and corrected values of the first embodiment;

FIG. 14 is a diagram exemplifying arrangement 2 of the complementary color filter of the first example of the second embodiment;

DETAILED DESCRIPTION OF THE INVENTION

Embodiments of the present invention will be described hereinbelow with reference to the drawings. The present invention is not to be limited to the embodiments and can be embodied in various forms without departing from the scope thereof.

First Embodiment

Hereinbelow, a first embodiment of the present invention will be described.

Hereinbelow, a concept of the first embodiment will be described. When carrying out correction of output values for pixel of segmented blocks of CCD (after-mentioned), it is basically necessary to set appropriate correction approximate straight-line group information to respective apparatuses in a factory. The first embodiment relates to the generating method and apparatus for the appropriate correction approximate straight-line group information.

Figure 15:
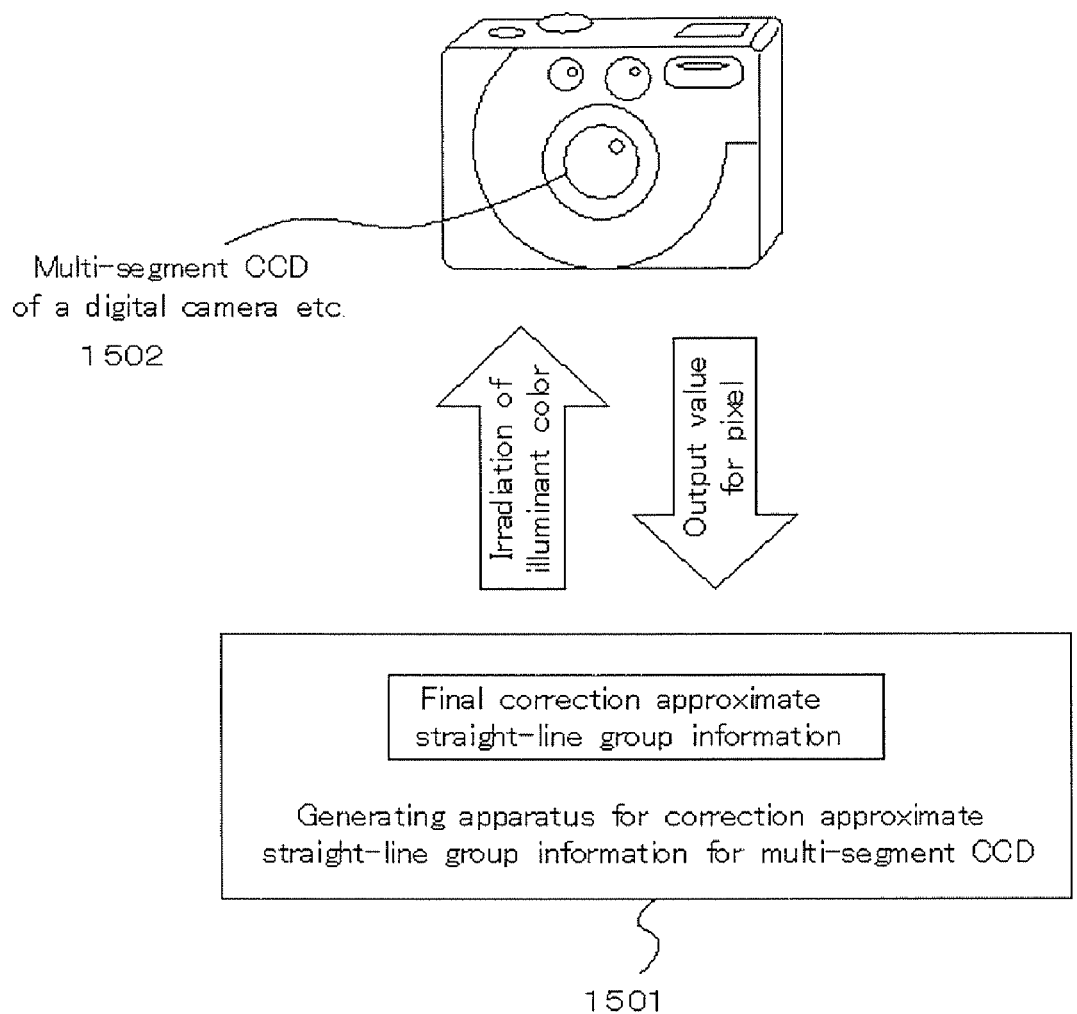
FIG. 15 is a schematic diagram of the first embodiment.

FIG. 15 is a schematic diagram of the first embodiment. In adjustment before shipment, a generating apparatus for correction approximate straight-line group information for multi-segment reading CCD 1501 irradiates illuminant color for correction (e.g., red, green, or blue) to a multi-segment CCD 1502, and acquires output values for pixel (after-mentioned) from the CCD. Subsequently, a plurality of first correction approximate straight-line group information (e.g., red, green, or blue) are generated based on difference of the acquired output values for pixel occurring between segmented blocks. Subsequently, the one final correction approximate straight-line group information is generated from the plurality of first correction approximate straight-line group information (e.g., red, green, or blue). The reason for generating the one final correction approximate straight-line group information from the plurality of first correction approximate straight-line group information is that first correction approximate straight-line group information of a closer color differs depending on the ratio of output values for pixel (so-called color components or carrier components). For example, as to the after-mentioned complementary color filter, in the case of generating final correction approximate straight-line group information as to a pixel type C1, the final correction approximate straight-line group information is to be generated from first correction approximate straight-line group information of red and of green. The reason for this is that it depends on the ratio of output values for pixel as to the pixel type C1 to C2 to carry out appropriate correction, correction to make a red-tinged color or correction to make a green-tinged color. Therefore, in the case of correction to make a red-tinged color, the final correction approximate straight-line group information, which is close to the first correction approximate straight-line group information of red, is generated, and in the case of correction to make a green-tinged color, the final correction approximate straight-line group information, which is close to the first correction approximate straight-line group information of green, is generated.

Hereinbelow, a concept of correction approximate straight-line group information of the present invention will be exemplified.

Figure 1:
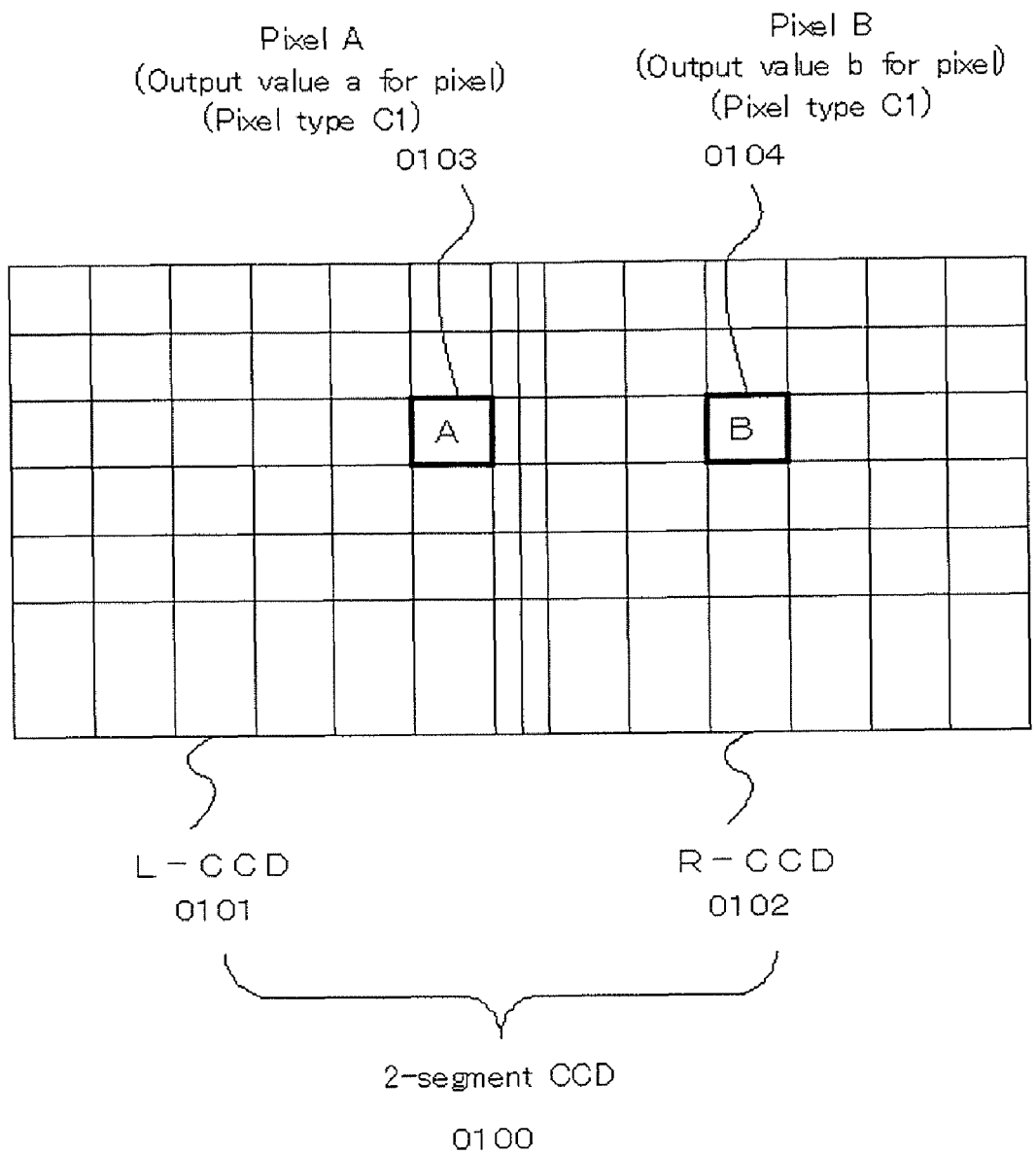
FIG. 1 is a diagram showing correction approximate straight-line group information of a first embodiment.
Figure 2:
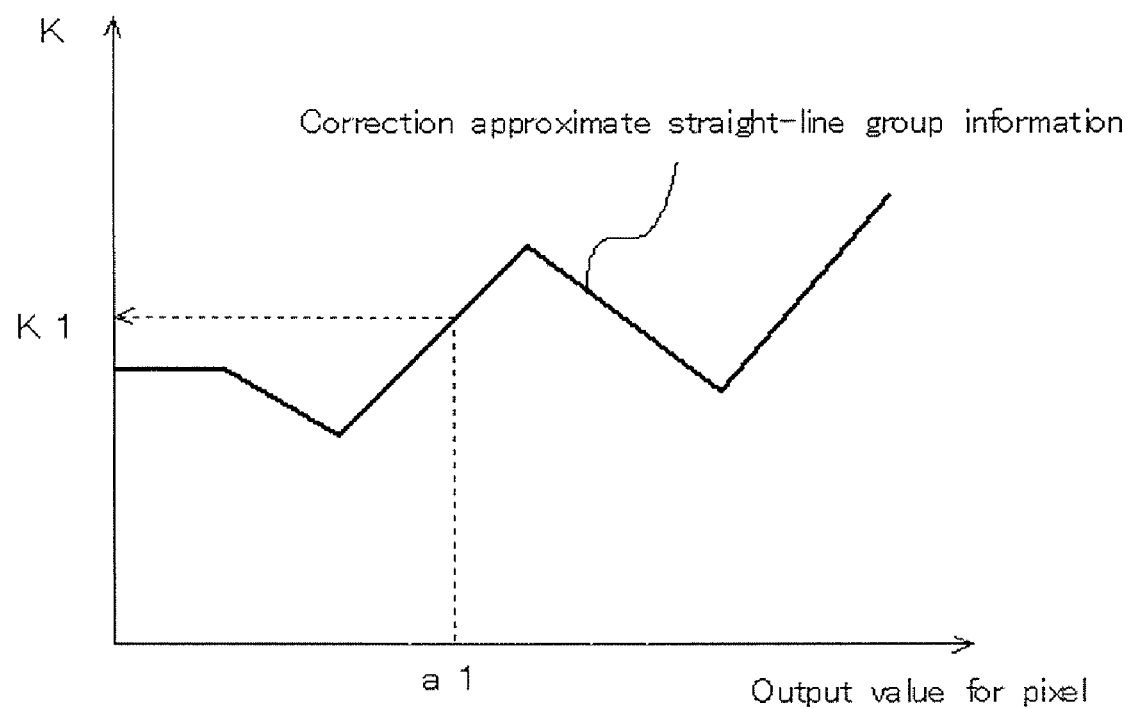
FIG. 2 is a schematic diagram showing correction approximate straight-line group information of the first embodiment.

FIGS. 1, 2, and 3 are diagrams showing concept of correction approximate straight-line group information, and explain the case where a CCD is segmented into right and left blocks.

FIG. 1 is a diagram showing a pixel, which is a target for using correction approximate straight-line group information, and is used for generating correction approximate straight-line group information. A 2-segment CCD (0100) is configured by a left-block L-CCD (0101) and a right-block R-CCD (0102). The L-CCD comprises a pixel A (0103) and the R-CCD comprises a pixel B (0104). Here, it is assumed that the pixel A (0103) and the pixel B (0104) are the same type of pixel (e.g., the complementary color filter C: Mg+Ye), and an output value a for pixel corresponds to the pixel A, and an output value b for pixel corresponds to the pixel B. Considering a property of CCD, there is a gain difference between the output values a and b for pixel. In order to compensate the gain, K is added to the output value a for pixel. Therefore, a corrected output value d for pixel of the pixel A is expressed by a formula d=a+K, and by plotting K according to an amount of received light on the pixel A, correction approximate straight-line group information is acquired.

FIG. 2 is a schematic diagram showing correction approximate straight-line group information of the first embodiment. In cases where an output value a1 for pixel corresponding to the pixel A in the left block is corrected based on an input value, in FIG. 2, K1, which corresponds to K, is added to the output value a1 for pixel (a corrected output value d1 for pixel corresponding to the pixel A is expressed by a formula d1=a1+K1), so that the same output value for pixel as the output value b1 for pixel corresponding to the pixel B in the right block is outputted to a display.

FIG. 3 is a diagram exemplifying the relation between CCD pixels and corrected values in the case of carrying out correction by means of correction approximate straight-line group information. Pixel number in CCD, pixel type, output value for pixel, correction approximate straight-line group information to be used, value for correction, and corrected value are included in one set. For example, as to a pixel, of which a pixel number in CCD is 10000, its output value for pixel is a1 when its pixel type is C1, and one correction approximate straight-line group information acquired according to its pixel type is f1. Further, a value for correction acquired by means of the one correction approximate straight-line group information is +K1, and a corrected output value for pixel is a1+K1.

Hereinbelow, components of the first embodiment will be described.

Figure 16:
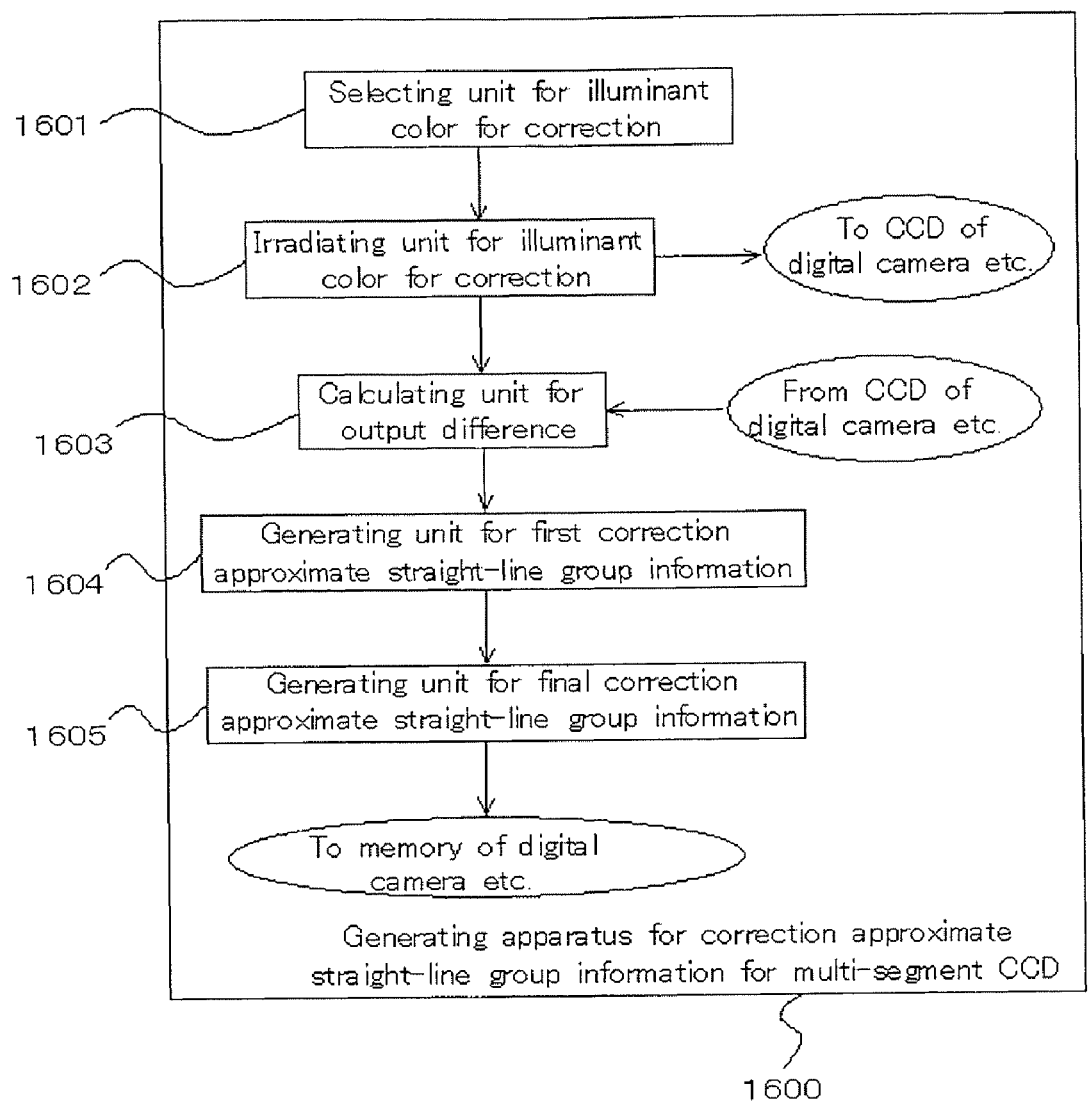
FIG. 16 is a functional block diagram of the first embodiment.

FIG. 16 is a functional block diagram of the generating apparatus for correction approximate straight-line group information for multi-segment reading CCD of the first embodiment. A generating apparatus for correction approximate straight-line group information for multi-segment reading CCD 1600 comprises a selecting unit for illuminant color for correction 1601, an irradiating unit for illuminant color for correction 1602, a calculating unit for output difference 1603, a generating unit for first correction approximate straight-line group information 1604, and a generating unit for final correction approximate straight-line group information 1605.

Prior to describing the components, CCD (Charge Coupled Device) will be described.

A 'CCD' is an imaging sensor, which converts light into charge by photoelectric effect.

Figure 5:
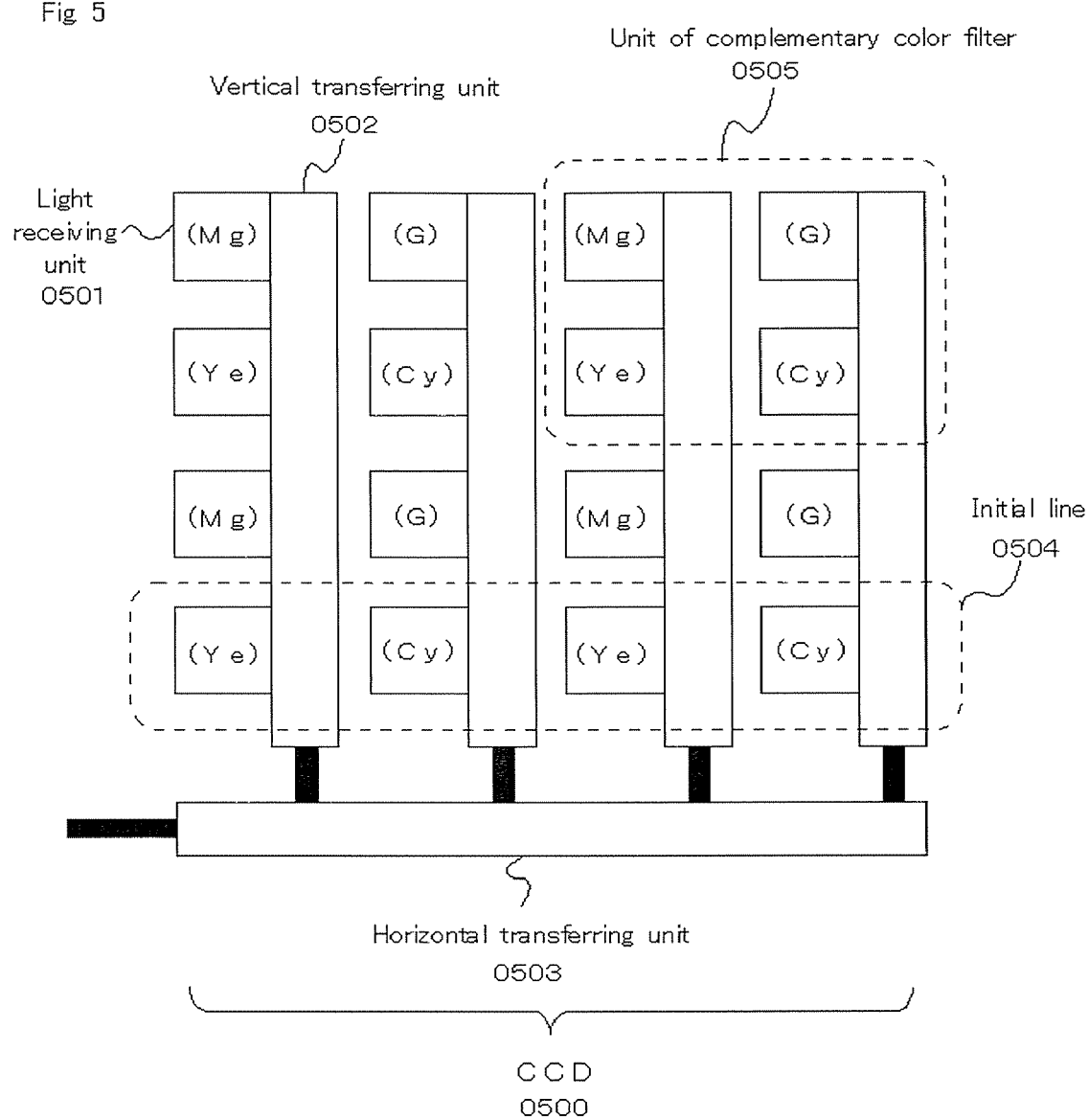
FIG. 5 is a schematic diagram of CCD of the first embodiment.

FIG. 5 is a schematic diagram of general CCD. A CCD 500 comprises a receiving unit 0501, a vertical transferring unit 0502, and a horizontal transferring unit 0503. In CCD, photodiodes (light receiving element), which is for sensing brightness (signal intensity of light), are regularly arranged in a matrix in a plane. The CCD is classified into frame transfer-type CCD, interline transfer-type CCD, full frame transfer-type CCD, or frame interline transfer-type CCD etc. The light receiving unit comprising a plurality of light receiving elements receives light from an object, and converts light into charge by photoelectric effect. The charge, which has been converted, is transferred to the vertical transferring unit. Charges in an initial one line 0504 (a portion surrounded by perforated lines in FIG. 5, and also known as line) of the charges transferred to the vertical transferring unit are transferred to the horizontal transferring unit. The horizontal transferring unit outputs the charges in the initial one line to a signal amplification circuit etc. as charges corresponding to one scanning line. When the charges are transferred from the horizontal transferring unit to the signal amplification circuit etc., charges in the subsequent one line are transferred from the vertical transferring unit to the horizontal transferring unit. The above processes are repeated for all lines of the vertical transferring unit. Thus, the CCD completes transfer of all charges within a predetermined period of time, and outputs charges in one frame (or one field). For example, in cases where CCD is used for an imaging sensor of recording apparatus for recording a moving image such as a video camera, transfer of charges in one frame is completed within 1/30 sec. The charges outputted from the CCD are amplified up to a predetermined output value for pixel by the signal amplification circuit, and necessary image processing is carried out by circuits.

Here, the light receiving element can store only information regarding intensity of light, so that information regarding color cannot be acquired (i.e., it can store only amount of charges, which is described as an output value for pixel in this specification (after-mentioned)). Therefore, in order to express a color, the CCD is configured to photodegrade light by means of a primary color filter or a supplementary color filter, and to generate color information by means of a combination of color information of a plurality of pixels (e.g., in a portion 0505 surrounded by perforated lines in FIG. 5, the supplementary color filter expresses one color by a plurality of light receiving elements). Here, the term 'primary color filter' means filters of R (Red), G (Green), and B (Blue), which are the three primary colors of light. For example, as described above, the light receiving element of the CCD is unable to identify color, so that RGB filter is equipped with a digital camera in order to acquire color information. Further, as to the arrangement pattern of color filters with respect to each pixel of the CCD, even in the case of a normal RGB primary color filter, the color filters are arranged not in order of RGB, and there are usually twice as many Green filters as other color filters because the human eye is most sensitive to green. Vividness is a characteristic of the primary color filter. However, in the case of a low-resolution CCD, when enlarging a photographed image, the above arrangement pattern can appear as noise. Further, the primary color filter has low light transparency, thereby having a tendency of low sensitivity. Subsequently, the term 'complementary color filter' includes filter of G (Green) in addition to filters of Cy (Cyan, Green and blue), Mg (Magenta, Blue and Red), and Ye (Yellow, Green and Red), which are complementary colors of the three primary colors of light (refer to a portion 0505 surrounded by perforated lines in FIG. 5). In the case of using the complementary color filter, calculation of the output values for pixel of Cyan, Magenta, and Yellow is carried out, thereby generating the output values for pixel of Red, Green and Blue. In the case of using complementary color filter, RGB is reproduced after the calculation, thereby causing loss in color reproduction, so that vividness as in the primary color filter cannot be reproduced, and its color tone is poor. Further, in the calculation process, color tone becomes narrow and unnatural. Meanwhile, the complementary color filter has high light transparency, and the calculation is carried out by adding green, which is a color including the most brightness information for the human eye, so that the complementary color filter generally has high sensitivity. In addition, as to the complementary color filter, sharpness tends to be calculated in generating an image, so that the complementary color filter generally has high resolution. For example, an image photographed by a digital camera equipped with the complementary color filter CCD generally has high sharpness and natural color tone.

Hereinbelow, the components of the present invention will be described.

The 'selecting unit for illuminant color for correction' selects a plurality of illuminant colors in accordance with said pixel type of CCD. Here, the term 'illuminant color for correction' means an illuminant color used for generating first correction approximate straight-line group information (after-mentioned). Examples of the illuminant color for correction include white, red, green, blue, and yellow. Further, the term 'pixel type' means a type of a color filter corresponding to color information of a pixel of CCD. Examples of the pixel type include red filter, green filter, and blue filter in the case of using the primary color filter, and cyan filter, magenta filter, yellow filter, and green filter in the case of using the complementary color filter. A plurality of illuminant colors for correction (e.g., white, red, green, and blue) are selected with respect to each pixel type (e.g., cyan filter, magenta filter, yellow filter or green filter). The selected plurality of illuminant colors for correction are used in the irradiating unit for illuminant color for correction.

The 'irradiating unit for illuminant color for correction' irradiates an illuminant color for correction selected in said selecting unit for illuminant color for correction to said CCD. Further, the light intensity of the illuminant color for correction to be irradiated can be set arbitrarily. The irradiated illuminant color for correction is used in the calculating unit for output difference.

The 'calculating unit for output difference' calculates an output difference between the segment reading blocks with respect to each illuminant color for correction based on the illuminant color for correction irradiated in said irradiating unit for illuminant color for correction. The output difference of output value for pixel is used in the generating unit for first correction approximate straight-line group information.

Here, the term 'segment reading' means that the light receiving unit of CCD is segmented into a plurality of blocks, and corresponding to this, the vertical transferring unit and horizontal transferring unit are also segmented into a plurality of blocks, and output values for pixel (after-mentioned) are outputted. Note that in cases where the division is only in the vertical direction, it is unnecessary to segment the vertical transferring unit, and in cases where the division is only in the horizontal direction, it is unnecessary to segment the horizontal transferring unit. Examples of the division include 2-segment, 3-segment, and 4-segment. The purpose of the segmentation is to transfer the output values for pixel in one frame (or in one field) within a predetermined period of time even when number of pixels of CCD is large. For example, in the case of 2-segment CCD, the light receiving unit is segmented into 2 blocks, right and left blocks, and corresponding to this, the vertical transferring unit and the horizontal transferring unit are also segmented into 2 blocks, right and left blocks, respectively, so that it becomes possible to segment the output values for pixel in one line into output values for pixel of the left-block and of the right-block, and to transfer them. This CCD having the 2-block horizontal transferring unit is able to complete transfer within a half period of time in comparison with a CCD, which has the same number of pixels and 1-block horizontal transferring unit (a CCD, of which light receiving unit and horizontal transferring unit are not segmented into 2 portions).

Further, the term 'output difference between the segment reading blocks' means level differences of output values for pixel occurring between a plurality of blocks. These level differences mainly occur due to different signal paths for outputting the output value for pixel. For this reason, in cases where correction is not carried out, when reproducing and displaying the output values for pixel, brightness is different between a plurality of blocks in one image, thereby deteriorating image quality. Therefore, in the present invention, by correcting the output values for pixel of a plurality of blocks, differences of the output values for pixel occurring between a plurality of blocks are corrected.

Subsequently, the output value for pixel will be described. The term 'output value for pixel' means a signal value to be outputted to a pixel configuring a displaying apparatus for displaying an image. The output value for pixel may be a value of unit of pixel (light receiving element) configuring the multi-segment reading CCD, or may be a value acquired by calculation (e.g., addition or subtraction etc.) of the output values for pixel of a plurality of pixels (light receiving elements). For example, correction process may be carried out after converting the output values for pixel of four types of pixels, Cy, Mg, Ye and G, which has been used for the complementary color filter, to the output values for pixel of C1: Mg+Ye, C2: G+Cy, C3: Mg+Cy, and C4: G+Ye. Alternatively, the correction process may be carried out after converting the output values for pixel of the four types of pixels, Cy, Mg, Ye and G, which have been used for the complementary color filter, into the output values for pixel of three types of pixels, R, G and B, which are the primary colors.

The 'generating unit for first correction approximate straight-line group information' generates first correction approximate straight-line group information Here, the term 'first correction approximate straight-line group information' means information regarding straight line group used for generating one final correction approximate straight-line group information. The first correction approximate straight-line group information is generated based on the output difference calculated by the calculating unit for output difference. Further, a plurality of first correction approximate straight-line group information are generated with respect to each illuminant color for correction. For example, in the case of using the primary color filter, all pixels are configured by repetition of three colors, R (Red), G (Green) and B (Blue), so that a plurality of first correction approximate straight-line group information are generated as to the three colors, R, G and B, or as to a combination of R, G, and B. Further, in the case of using the complementary color filter, all pixels are configured by repetition of four colors, Cy (Cyan, Green and blue), Mg (Magenta, Blue and Red), Ye (Yellow, Green and Red) and G (Green), so that a plurality of first correction approximate straight-line group information are generated as to the four colors, Cy, Mg, Ye and G, or as to a combination of Cy, Mg, Ye and G. Note that the output difference between the average values of the output values for pixel in the central pixel area of the segmented block, which is used as a standard, and the average value of the output values for pixel in the central pixel area of another block is calculated with respect to each pixel type, and irradiation intensity of the illuminant color for correction is changed, so that the first correction approximate straight-line group information is generated. The first correction approximate straight-line group information is used in the generating unit for final correction approximate straight-line group information.

Hereinbelow, a generating method for first correction approximate straight-line group information will be described. As a simple example, the first correction approximate straight-line group information in cases where the multi-segment reading CCD is segmented into right and left blocks, will be described. Note that in this specification, unless otherwise noted, a capital alphanumeric character is used for expressing a specific pixel, and a lower-case alphanumeric character corresponding to the capital alphanumeric character is used for expressing an output value for pixel corresponding to the specific pixel. Further, in this specification, pixel type is expressed in brackets. For example, a 'pixel A' means that a pixel, of which position is to be specified, is A, and 'a' means that an output value for pixel of the pixel A is a, or an output value for pixel of the pixel type A is a. Further, a 'pixel (A1)' means that a pixel type is A1. Further, a 'pixel A (A1)' means that a pixel type of the pixel A is A1.

Figure 6:
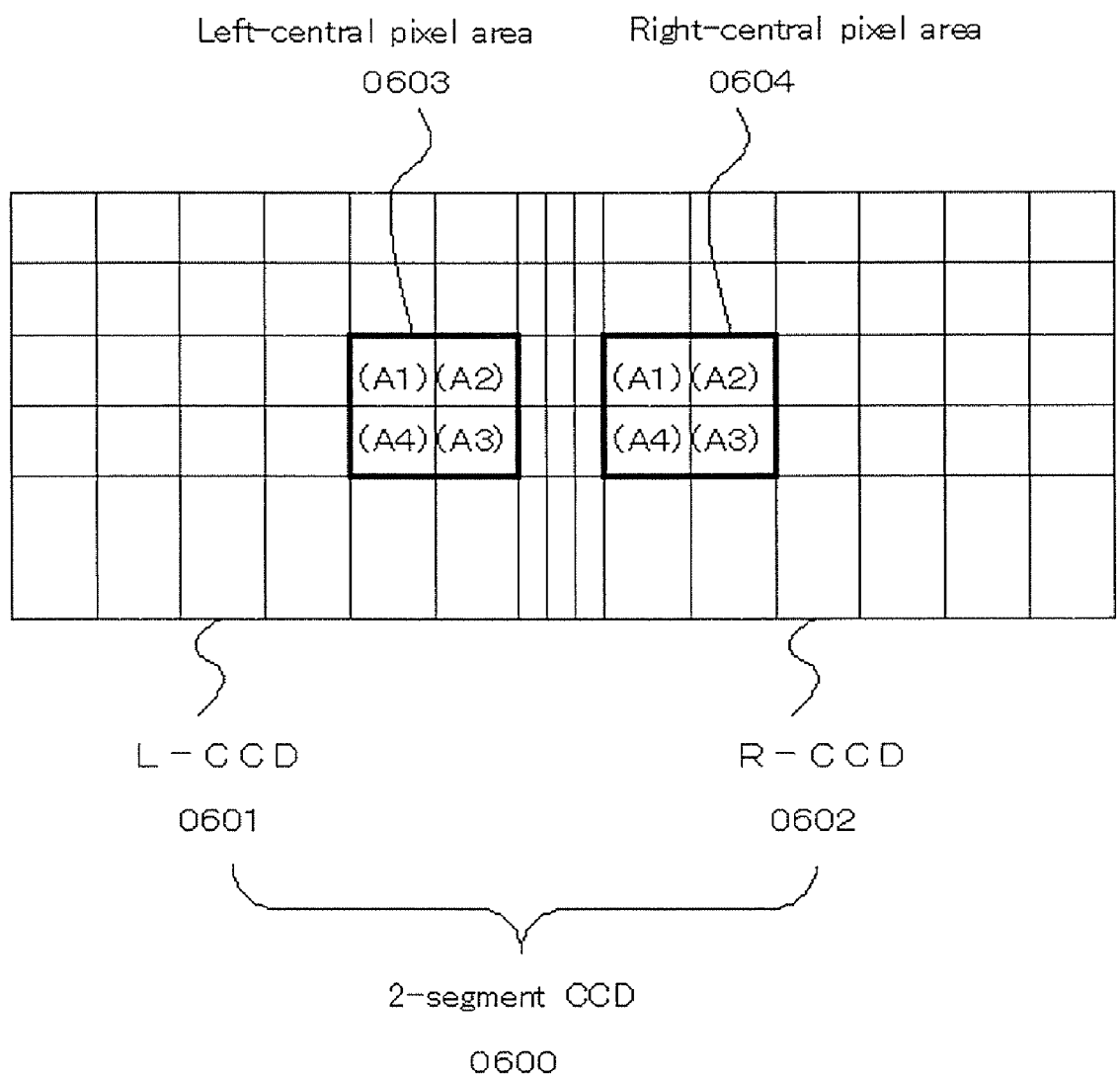
FIG. 6 is a schematic diagram of 2-segment CCD of the first embodiment.

FIG. 6 is a schematic diagram of 2-segment CCD of the first embodiment. a 2-segment CCD (0600) is segmented into a L-CCD (0601) and a R-CCD (0602). For example, it is assumed that all pixels of 2-segment CCD are configured by four types of pixels (A1), (A2), (A3), and (A4). Therefore, the four types of pixels (A1), (A2), (A3), and (A4) express one color. Here, the central pixel area of the 2-segment CCD is segmented into a left-central pixel area 0603, and a right-central pixel area 0604. The left-central pixel area 0603 and the right-central pixel area 0604 comprise four types of pixels (A1), (A2), (A3), and (A4), respectively. In generating first correction approximate straight-line group information, at the outset, output values for pixel in the left-central pixel area and in the right-central pixel area are measured with respect to each pixel type. For example, average values of the output values for pixel of the pixel (A1) in the left-central pixel area and of the output values for pixel of the pixel (A1) in the right-central pixel area are calculated, and the difference between them is calculated. Subsequently, irradiation intensity of illuminant color for correction to be irradiated on the pixel (A1) is changed, and the average values of the output values for pixel are plotted on a horizontal axis, and gain differences of the output values for pixel between the right and left blocks are plotted on a vertical axis, so that the first correction approximate straight-line group information of the pixel (A1) is generated. The above processes are repeated as to a plurality of colors to be used for correction (illuminant colors for correction) of an entire object, so that a plurality of first correction approximate straight-line group information are generated. Further, the above processes are carried out with respect to each type of pixels (A2), (A3), and (A4), so that a plurality of first correction approximate straight-line group information as to each type of pixel (A2), (A3), and (A4) are generated.

Figure 7:
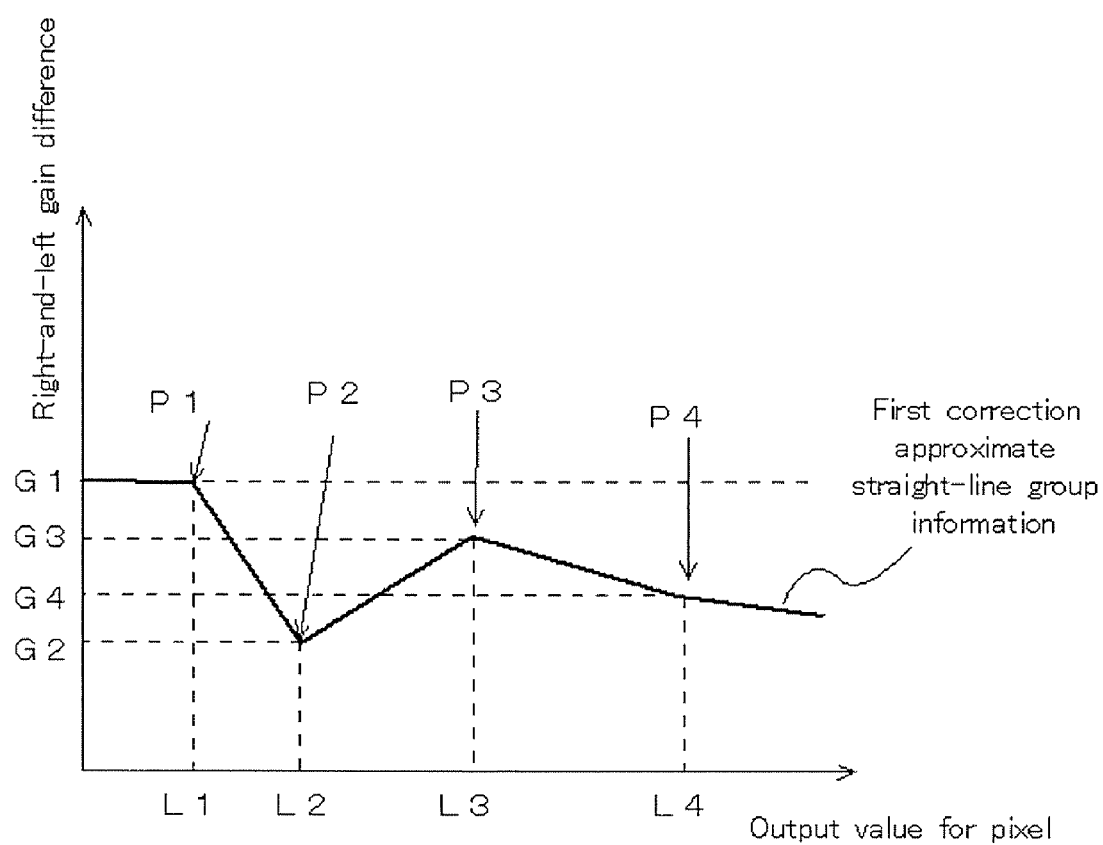
FIG. 7 is a diagram showing first correction approximate straight-line group information of the first embodiment.

FIG. 7 is a diagram showing a generating method for first correction approximate straight-line group information (in the case of 2-segment CCD). The horizontal axis indicates output value for pixel, and the vertical axis indicates gain difference of the output values for pixel between the right and left pixels. At the outset, output value for pixel of a specific color to be used for correction (illuminant color for correction) from an object is increased from L1 to L4. As the output value for pixel changes, the right-and-left gain difference changes from G1 to G4. An intersection of L1 with G1 is P1 (the same is applied to P2, P3, and P4). The P1, P2, P3, and P4 are connected by a straight line, thereby generating first correction approximate straight-line group information. The first correction approximate straight-line group information is stored in a memory. As to the other colors to be used for correction (illuminant colors for correction), the first correction approximate straight-line group information is generated.

Figure 8:
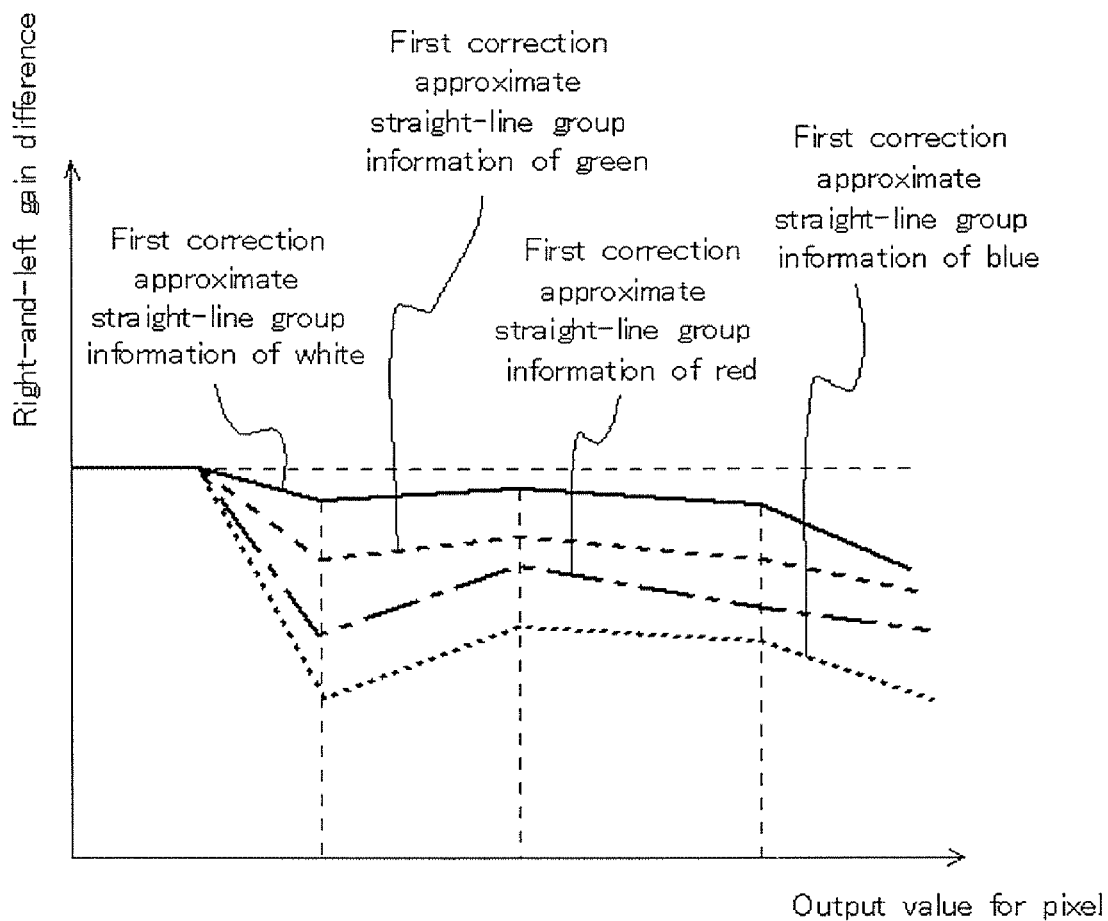
FIG. 8 is a diagram showing a plurality of first correction approximate straight-line group information of the first embodiment.

FIG. 8 is a diagram showing first correction approximate straight-line group information as to the pixel (A1) including first correction approximate straight-line group information as to a plurality of colors to be used for correction (illuminant colors for correction: white, red, green, and blue). Similarly, as to the other types of pixels, (A2), (A3), and (A4), a plurality of first correction approximate straight-line group information are generated.

Note that in the present invention, sizes of the left-central pixel area and the right-central pixel area can be set arbitrarily. Further, in the present invention, a pixel area used for generating the first correction approximate straight-line group information is not limited to a central portion. Therefore, the pixel area may be separately arranged in right and left portion. Further, although the pixel area used for generating the first correction approximate straight-line group information may be the smallest number of pixel areas necessary for generating the first correction approximate straight-line group information (e.g., in the case of using four types of pixels, (A1), (A2), (A3), and (A4), the four types of pixels in respective right and left portions are used), it is preferable to use a plurality of pixels and average values.

The 'generating unit for final correction approximate straight-line group information' generates one final correction approximate straight-line group information with respect to each said pixel type based on the plurality of first correction approximate straight-line group information generated in said generating unit for first correction approximate straight-line group information. Here, the term 'final correction approximate straight-line group information' means that correction approximate straight-line group information finally used for photographing an object. Hereinbelow, a generating method for one final correction approximate straight-line group information with respect to each pixel type based on the plurality of first correction approximate straight-line group information will be described. For generating one final correction approximate straight-line group information, for example, ratio of color component (carrier component) is used. For example, in the case of using four types of pixels (A1), (A2), (A3), and (A4), the above-mentioned ratios, a1/a2 and a3/a4 are used. This has been determined from an experimental result that difference between blocks due to property of CCD or to variation from analog circuit is approximately proportional to ratio of carrier component. Hereinbelow, the generating method for final correction approximate straight-line group information will be described with reference to drawings.

Figure 9:
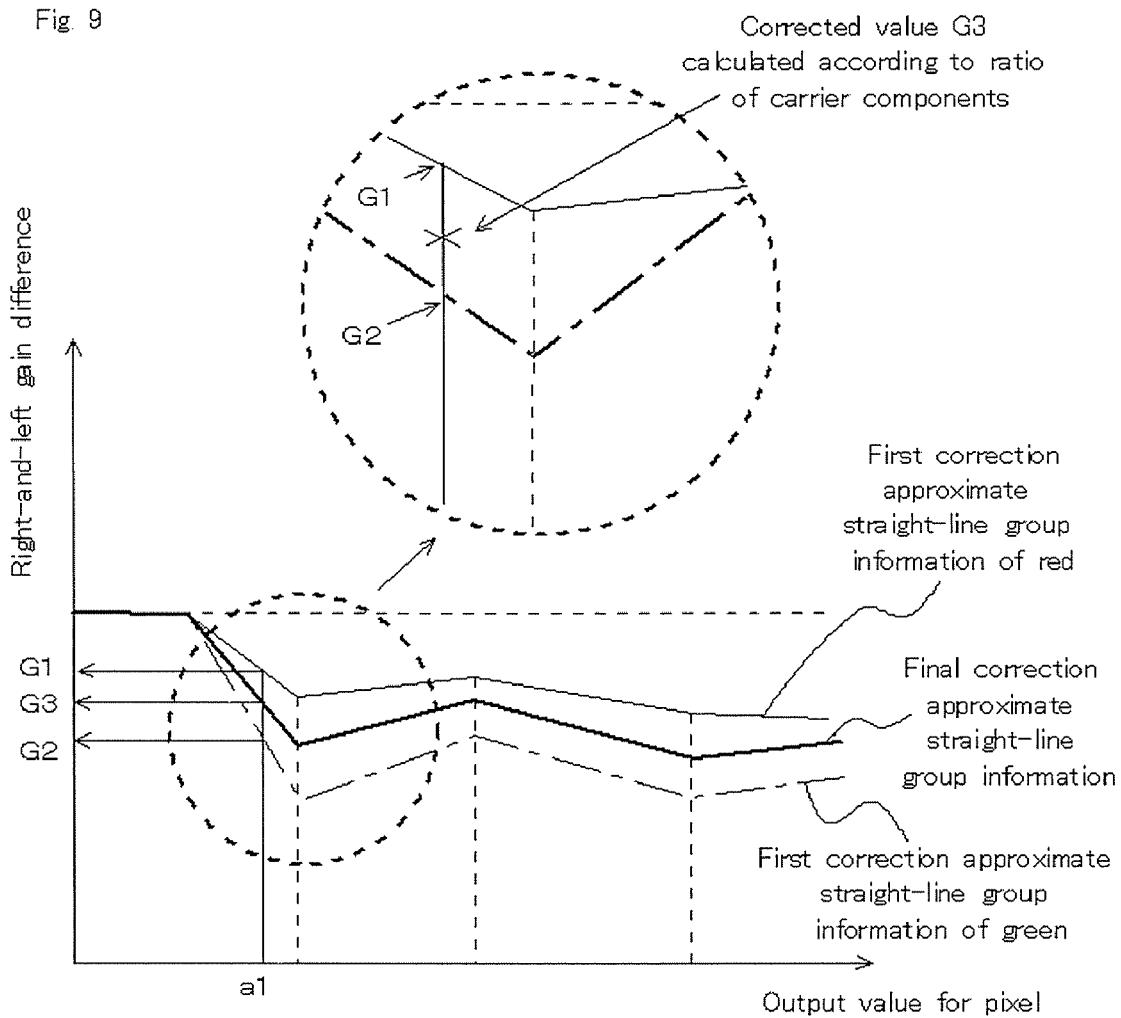
FIG. 9 is a diagram showing final correction approximate straight-line group information of the first embodiment.

FIG. 9 is a diagram showing final correction approximate straight-line group information. As a simple example, the case of generating final correction approximate straight-line group information from first correction approximate straight-line group information of red and of green as to the pixel type A1 will be described. In FIG. 9, as to the output value a1 for pixel, right-and-left gain differences of the output values for pixel of the first correction approximate straight-line group information of red and of green are G1 and G2, respectively. In this case, for example, G3, the right-and-left gain difference of the output values for pixel of the final correction approximate straight-line group information, is acquired as (G1+G2)/2. By plotting this value varying the output value a1 for pixel, the one final correction approximate straight-line group information of the pixel (A1) is generated. Similarly, as to the other types of pixels, (A2), (A3) and (A4), the final correction approximate straight-line group information is generated, respectively. Further, the above calculation of G3 may be carried out by means of a plurality of first correction approximate straight-line group information based on the output values for pixel. Here, the term 'based on the output values for pixel' means that the output values for pixel may not be limited to value of the pixel used for generating the first correction approximate straight-line group information, and may include values acquired by a predetermined calculation on the output values for pixel of the above pixel itself and of adjacent pixels. Further, in cases where a certain pixel A is targeted, the 'adjacent pixels' includes pixels next to A, several pixels away from A in a horizontal direction, several pixels away from A in a vertical direction, or several pixels away from A in a diagonal direction. Further, examples of the 'predetermined calculation' include ratio of the output values for pixel of the pixel A itself to the adjacent pixel, and ratio of sum or difference of the output values for pixel of the pixel A itself to the adjacent pixel. For example, assuming that the pixel to be targeted is A (the output value for pixel is a), and the adjacent pixel is B (the output value for pixel is b), examples of the predetermined calculation include a/b, b/a, (a+b)/(a−b), and (a−b)/(a+b).

Figure 10:
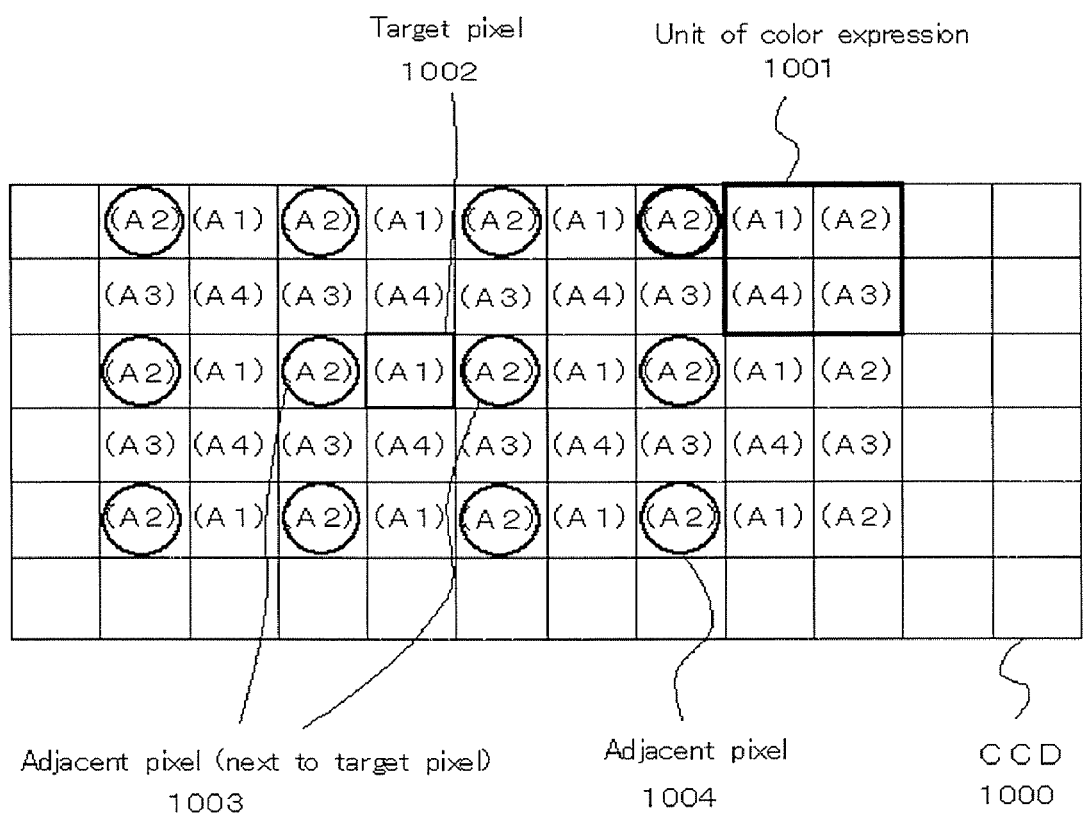
FIG. 10 is a diagram showing adjacent pixels of the first embodiment.

FIG. 10 is a diagram showing adjacent pixels of the first embodiment. A CCD (1000) is configured by four types of pixels, (A1), (A2), (A3), and (A4). The four types of pixels, (A1), (A2), (A3), and (A4) form a unit 1001 for expressing a color, and these four types of pixels are repeatedly arranged, thereby configuring all pixels. Here, it is assumed that the ratio of the output values a1 to a2, a1/a2, is used. For example, if the pixel to be targeted is a target pixel 1002, the adjacent pixels are circled pixels (A2) in FIG. 10. Adjacent pixels 1003 (A2) are next to the target pixel 1002 (A1). The other adjacent pixels, for example, an adjacent pixel 1004 (A2) is not next to the target pixel 1002 (A1). In cases where the ratio of the output values a3 to a4, a3/a4, is used as a predetermined calculation, the above concept of adjacent pixel is similar.

The correction is practically carried out by calculating correction value from output values for pixel as to all pixels by means of one final correction approximate straight-line group information, which is common in respective pixel types and has been generated with respect to each pixel type.

Hereinbelow, a processing flow of the first embodiment will be described. Note that the after-mentioned processing flow can be implemented as a method, as a program operated by a computer, or as a readable recording medium storing the program. (the same is applied to the other processing flows in this specification).

Figure 4:
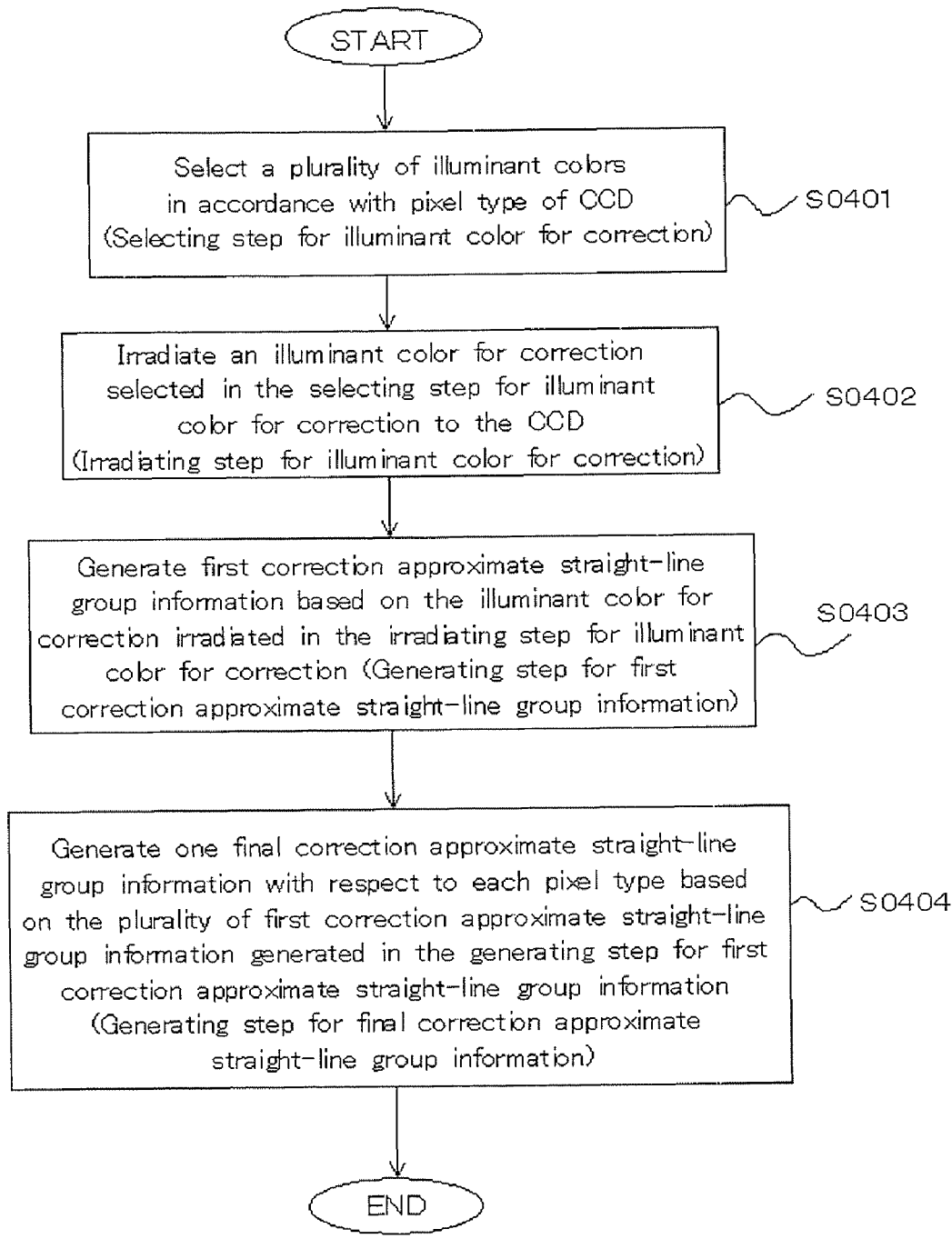
FIG. 4 is a flow chart of the first embodiment.

FIG. 4 is a flow chart of the first embodiment.

In the generating method for correction approximate straight-line group information for multi-segment reading CCD, at the outset, a selecting step for illuminant color for correction (step S0401) selects a plurality of illuminant colors in accordance with said pixel type of CCD. Subsequently, an irradiating step for illuminant color for correction (step S0402) irradiates a illuminant color for correction selected in said selecting step for illuminant color for correction to said CCD. Subsequently, a generating step for first correction approximate straight-line group information (step S0403), which is for correcting output difference between segment reading blocks with respect to each pixel type, generates first correction approximate straight-line group information based on the illuminant color for correction irradiated in said irradiating step for illuminant color for correction. Subsequently, a generating step for final correction approximate straight-line group information (step S0404) generates one final correction approximate straight-line group information with respect to each said pixel type based on the plurality of first correction approximate straight-line group information generated in said generating step for first correction approximate straight-line group information.

According to the method and an apparatus for generating correction approximate straight-line group information for multi-segment reading CCD, it becomes possible to generate a plurality of first correction approximate straight-line group information with respect to each apparatus. The best one final correction approximate straight-line group information is generated from the generated plurality of first correction approximate straight-line group information. Therefore, as to all pixels, it becomes possible to carry out correction with respect to each pixel type by means of the one final correction approximate straight-line group information upon photographing.

Second Embodiment

Hereinbelow, the second embodiment will be described.

Hereinbelow, a concept of the second embodiment will be described. When carrying out correction of output value for pixel of segmented blocks of CCD (after-mentioned), it is basically necessary to set appropriate correction approximate straight-line group information to respective apparatuses in a factory. The second embodiment relates to the generating method and apparatus for the appropriate correction approximate straight-line group information.

Figure 17:
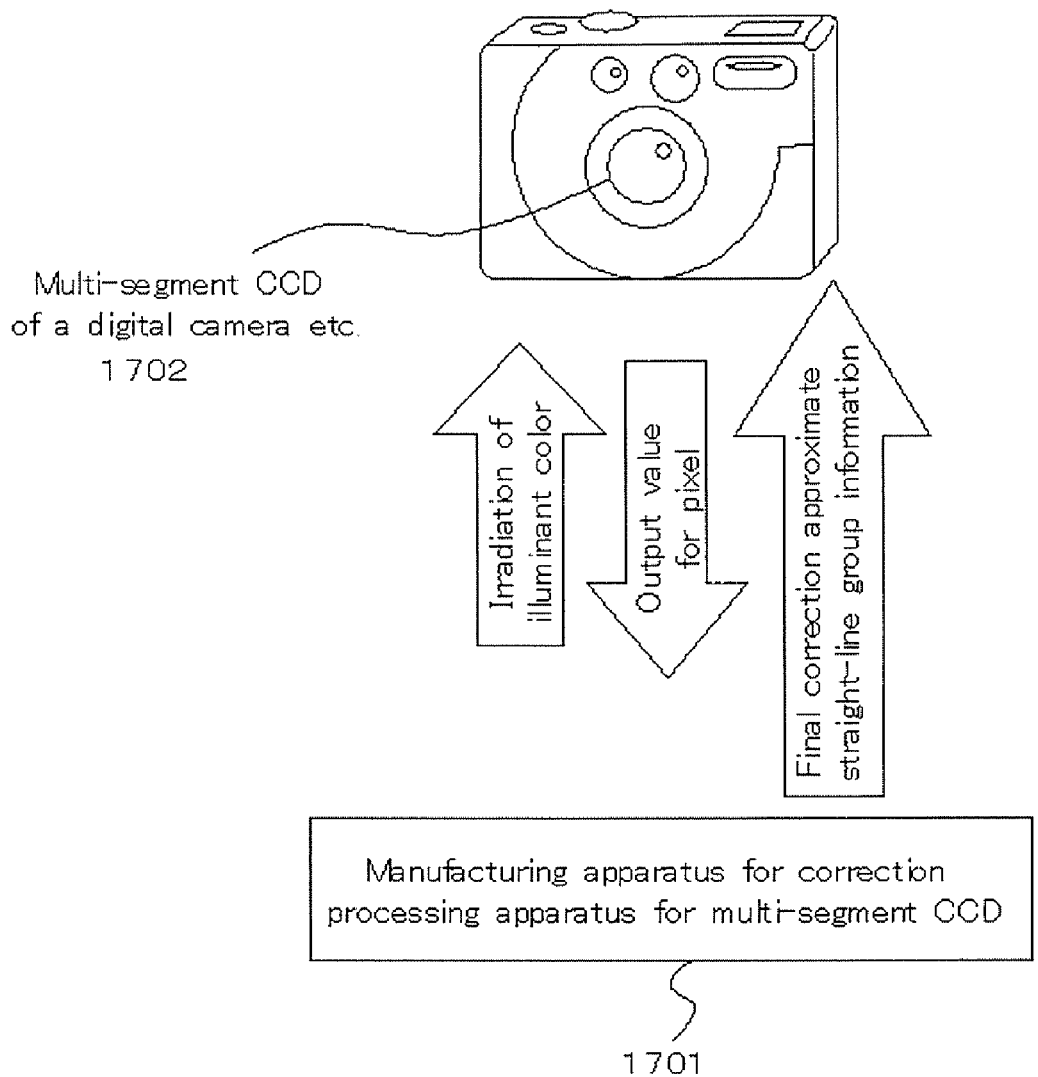
FIG. 17 is a schematic diagram of the second embodiment.

FIG. 17 is a schematic diagram of the second embodiment. In adjustment before shipment, a manufacturing apparatus for correction processing equipment for multi-segment reading CCD 1701 irradiates illuminant color for correction (e.g., red, green, or blue) to a multi-segment CCD 1702, and acquires output values for pixel from CCD. Subsequently, a plurality of first correction approximate straight-line group information (e.g., red, green, or blue) are generated based on difference of the acquired output value for pixel occurring between segmented blocks. Subsequently, the best one final correction approximate straight-line group information is generated from the plurality of first correction approximate straight-line group information (e.g., red, green, or blue), and is stored in a memory unit of the correction processing equipment for multi-segment reading CCD. Note that the reason for generating the best one final correction approximate straight-line group information from the plurality of first correction approximate straight-line group information is the same as that of the first embodiment, so that the description will be omitted.

Hereinbelow, components of the second embodiment will be described.

Figure 18:
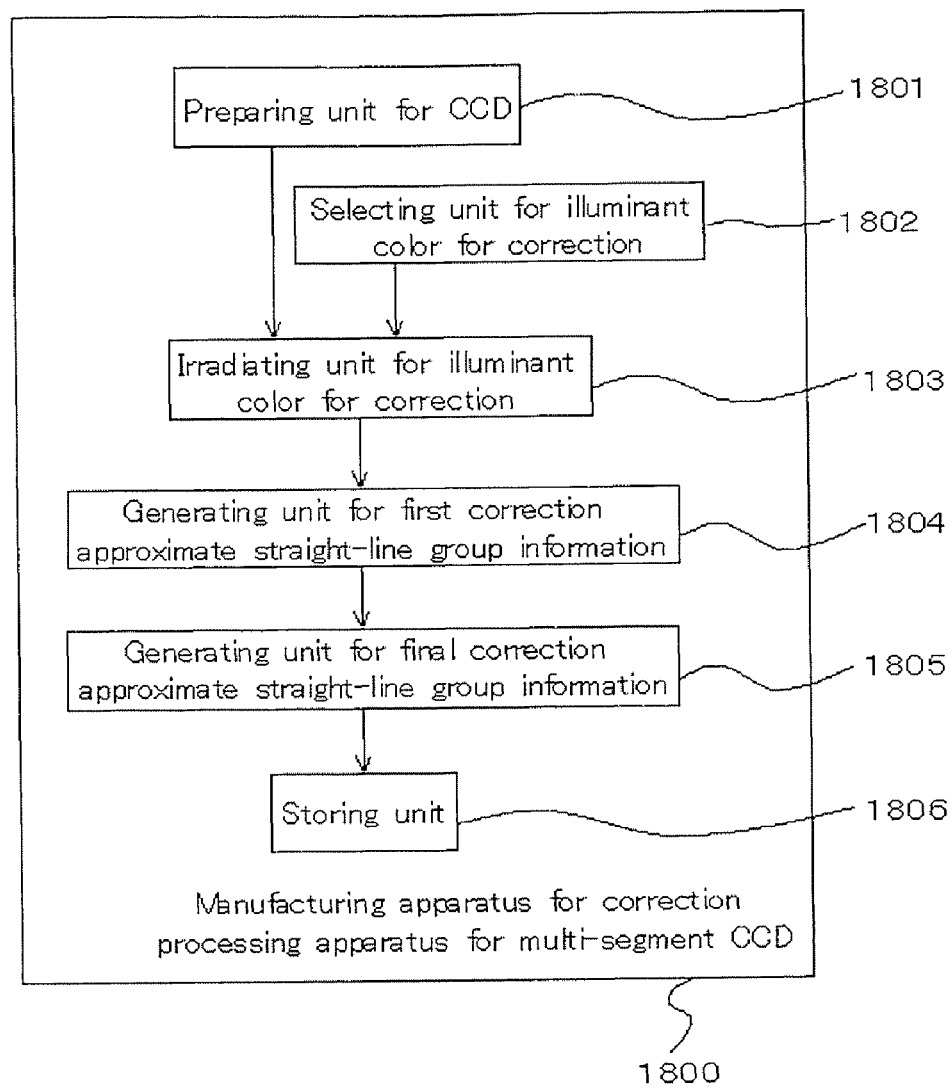
FIG. 18 is a functional block diagram of the second embodiment.

FIG. 18 is a functional block diagram of the second embodiment. A manufacturing apparatus for correction processing equipment for multi-segment reading CCD 1800 comprises a preparing unit for CCD 1801, a selecting unit for illuminant color for correction 1802, an irradiating unit for illuminant color for correction 1803, a generating unit for first correction approximate straight-line group information 1804, a generating unit for final correction approximate straight-line group information 1805, and a storing unit 1806.

Hereinbelow, the components of the second embodiment will be described.

The 'selecting unit for illuminant color for correction', the 'irradiating unit for illuminant color for correction', the 'generating unit for first correction approximate straight-line group information', and the 'generating unit for final correction approximate straight-line group information' are the same as those of the first embodiment, so that the description will be omitted.

The 'preparing unit for CCD' prepares a CCD to be corrected by the correction processing equipment. The prepared CCD is used in outputting to the irradiating unit for illuminant color for correction. Here, the term 'CCD' is the same as that of the first embodiment, so that the description will be omitted.

The 'storing unit' stores the final correction approximate straight-line group information correlated with said CCD, which has been acquired by said generating unit for final correction approximate straight-line group information, into a memory unit of the correction processing equipment. Here, examples of the 'memory unit' include an EEPROM and a non-volatile memory. Here, the terms 'correlated with CCD' means that the final correction approximate straight-line group information used for correction as to respective pixels in CCD is correlated with the respective pixels.

Example

Hereinbelow, the first example of the second embodiment will be described. In the first example, the correction processing equipment for 2-segment reading CCD manufactured by the method of the second embodiment will be described.

Figure 12:
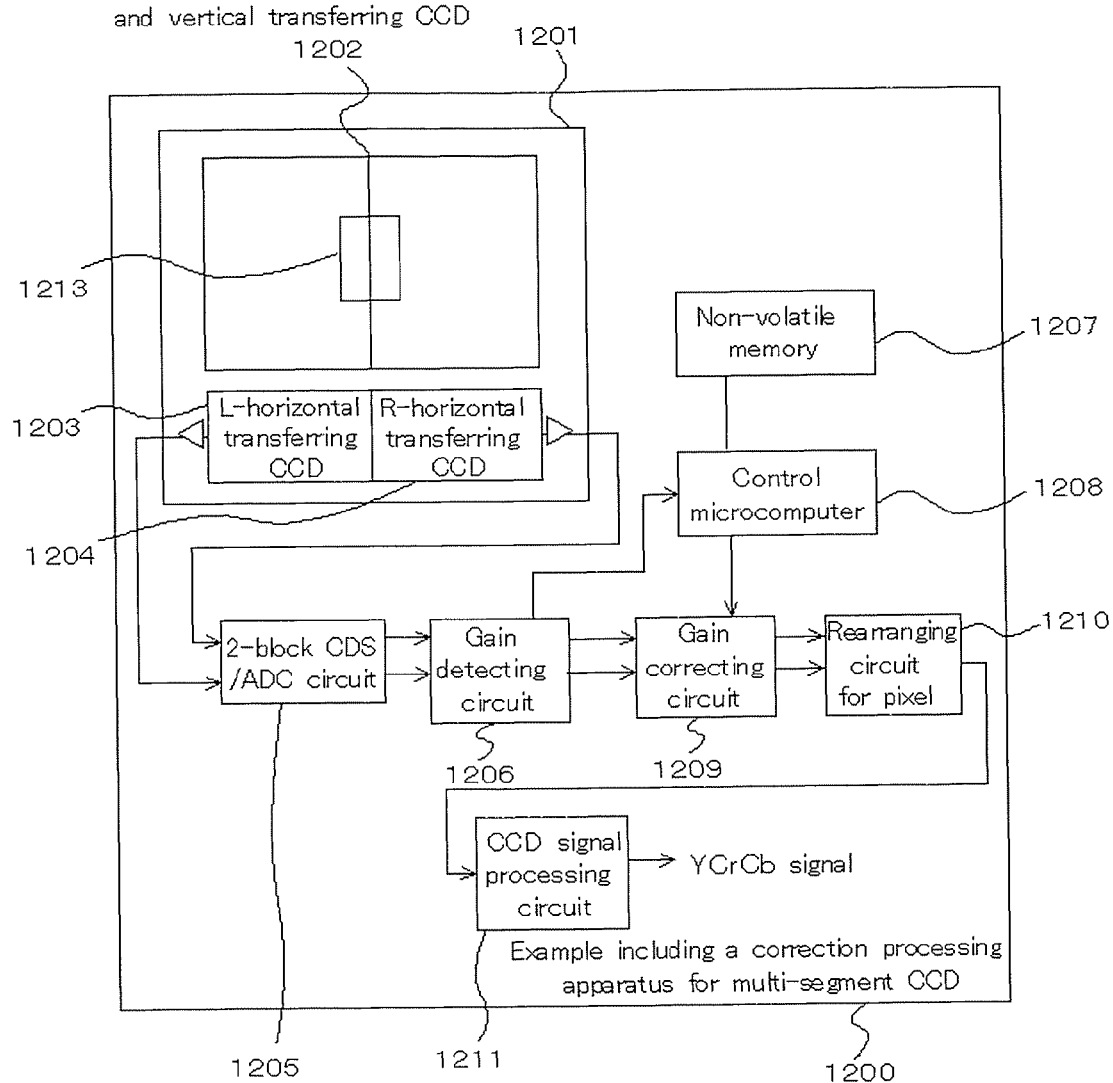
FIG. 12 is a concrete functional block diagram of the first example of the second embodiment.

FIG. 12 is a functional block diagram of the correction processing equipment 1200 for 2-segment reading CCD of the first example. The correction processing equipment for 2-segment reading CCD of the first example comprises a 2-segment reading CCD 1201, a 2-block CDS (Correlated Double Sampling)/ADC (Analog Digital Conversion) circuit 1205, a gain detecting circuit 1206, a non-volatile memory (e.g., EEPROM) 1207, a control microcomputer 1208, a gain correcting circuit 1209, a rearranging circuit for pixel 1210, and a CCD signal processing circuit 1211.

In addition, the 2-segment reading CCD 1201 comprises a light receiving element (photodiode) and a vertical transferring CCD 1202, and horizontal transferring CCDs 1203 and 1204. The light for photographing from an object is photo-electric converted by the light receiving element 1202, and is stored as charge. This charge is transferred to the vertical transferring CCD 1202 at a timing. The vertical transferring CCD 1202 is divided into two portions, right and left portions, and the charges in the left-half of vertical transferring CCD are transferred to the left-half of the horizontal transferring CCD 1203, and the charges in the right-half of vertical transferring CCD are transferred to the right-half of the horizontal transferring CCD 1204 at a timing of respective lines. The horizontal transferring CCDs 1203 and 1204 transfers the transferred charges, respectively, and the charges are outputted as voltage signals though amplifiers of right and left sides. The outputted signal is transferred to the 2-block CDS/ADC circuit 1205, and digitalized. The outputted signal is A/D converted, and is read in the respective blocks, so that level difference occurs It is known that this level difference occurs in the CCD and in the A/D conversion circuit, and is dependent on the output level of the light receiving element (Jpn. unexamined patent publication No. 2002-320412). Further, it has been confirmed by an experiment that the difference changes due to the color component (carrier component, output value for pixel of a type of pixel). Moreover, it changes due to a property of a board. The above processes are common in generating the final correction approximate straight-line group information and in normal photographing.

Subsequently, the generation of the final correction approximate straight-line group information will be described. In the generation of the final correction approximate straight-line group information, at the outset, in order to generate a plurality of first correction approximate straight-line group information, a uniform object (e.g., a screen), which has a large carrier component (e.g., red, green or blue) is photographed. Here, three colors (e.g., red, green and blue) are captured, and from them, the first correction approximate straight-line group information as to pixels (C1: Mg+Ye), (C2: G+Cy), (C3: Mg+Cy), and (C4: G+Ye) are generated, respectively. In the first example, red, green and blue are captured, and as to the pixels (C1) and (C2), the one final correction approximate straight-line group information is generated from the first correction approximate straight-line group information of red and of blue with respect to each pixel type, and as to the pixels (C3) and (C4), the one final correction approximate straight-line group information is generated from the first correction approximate straight-line group information of blue and of green with respect to each pixel type. The final correction approximate straight-line group information is generated by means of ratio of the carrier component (after-mentioned). This final correction approximate straight-line group information is stored in the non-volatile memory, and in normal photographing, the control microcomputer 1208 sets the final correction approximate straight-line group information stored in the non-volatile memory to the gain correcting circuit.

Hereinbelow, the carrier component will be described. As an example, a CCD using a complementary color filter will be described.

Figure 13:
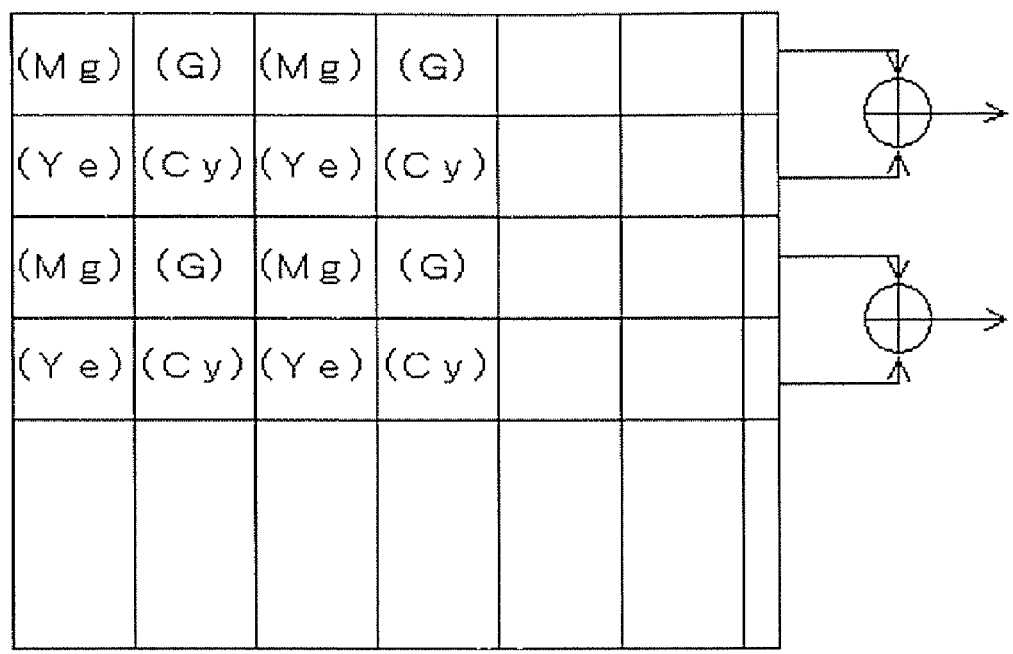
FIG. 13 is a diagram exemplifying arrangement 1 of the complementary color filter of the first example of the second embodiment.

FIGS. 13 and 14 are diagrams exemplifying arrangements of the complementary color filter. Normally, an arrangement of the complementary color filter is as shown in FIG. 13, and in shooting moving image, output values for pixel in a vertical direction are added, so that output in an arrangement as shown in FIG. 14 is carried out. Therefore, as to a certain line, the output value c1 for pixel of the pixel (C1: Mg+Ye) and the output value c2 for pixel of the pixel (C2: G+Cy) are alternately outputted. As to a subsequent line, the output value c3 for pixel of the pixel (C3: Mg+Cy) and the output value c4 for pixel of the pixel (C4: G+Ye) are alternately outputted. In photographing a still image, as to a certain field, the output value d1 for pixel of (Mg) and the output value d2 for pixel of (G) are alternately outputted. As to a subsequent field, the output value d4 for pixel of (Ye) and the output value d3 for pixel of (Cy) are alternately outputted. In cases where an object, which has fewer carrier components (e.g., white), is photographed, their ratios in a horizontal direction are close to 1. For example, in shooting moving image, c1/c2=1, and c3/c4=1. (This is the same as in the case of a primary color CCD. In the case of the primary color, as to a certain line, the output value e1 for pixel of (R) and the output value e2 for pixel of (G) are alternately outputted. As to a subsequent line, the output value e4 for pixel of (G) and the output value e3 for pixel of (B) are alternately outputted. In the case of the object, which has fewer carrier components, e1/e2=1, and e3/e4=1.) Here, from the average value of data of right and left portions of a CCD central area 1213 in FIG. 12 (e.g., average value as to each of the output value c1 for pixel of the pixel C1, the output value c2 for pixel of the pixel C2, the output value c3 for pixel of the pixel C3, and the output value c4 for pixel of the pixel C4), and as to the right-and-left gain difference (e.g., right-and-left gain differences as to the output values c1, c2, c3 and c4 for pixel of the pixels C1, C2, C3 and C4), average values of the gain differences are acquired, and from them, the first correction approximate straight-line group information are generated (e.g., as to each of the pixel (C1), (C2), (C3) and (C4), the first correction approximate straight-line group information is generated). In addition, ratio of carrier component in a horizontal direction at this point is also recorded. Therefore, as to the case of photographing an object, which has large carrier component, measurement is carried out changing amount of light for photographing, thereby calculating the ratio of the output values for pixel c1/c2 and c3/c4. Note that the values of c1, c2, c3 and c4 used for calculating the ratios of lines c1/c2 and c3/c4 are the average values of c1, c2, c3 and c4 when one of the right or left portion of the CCD central area is set as a standard.

Subsequently, calculation of the final correction approximate straight-line group information will be described. In the first example, by means of detection result of an object by a plurality of colors, the final correction approximate straight-line group information is acquired. Hereinbelow, the case of acquiring the output value for pixel from the object having a plurality of colors will be described. In cases where the output values for pixel detected in the gain detecting circuit (1206) are the same, for example, in the case of the pixel (C1), red has the largest right-and-left gain difference of YCrCb outputted from the CCD signal processor (1211) in comparison with other colors of the object. Therefore, as to the pixel (C1), red has the largest effect on the right-and-left gain difference in comparison with the other colors. In acquiring the final correction approximate straight-line group information, the largest ratio is given to red, which is the most effective color. As shown in FIG. 9, since red and green have large carrier components, the first correction approximate straight-line group information in cases where the object is red and the first correction approximate straight-line group information in cases where the object is green are acquired. Then, the final correction approximate straight-line group information is acquired so as to be close to red, which is the most effective on the right-and-left gain difference. Thus, the final correction approximate straight-line group information as to the pixels (C1) to (C4) is acquired with respect to each pixel type, so that the right-and-left gain difference becomes small at the final output level YCrCb. To be exact, there are errors, which are away from the final correction approximate straight-line group information, as to some colors. However, the colors are less effective, so that it becomes possible to reduce the right-and-left gain differences, comprehensively. Therefore, comparing with the conventional detection method by means of single color such as white, the above-mentioned method enables reduction of errors in the right-and-left gain differences.

In addition, in the gain detecting circuit (1206) of FIG. 12, if difference of noise amplitude between the right and left block is detected, noise is added and adjustment is carried out so as to level the amplitudes of input signals of the right and left blocks in the gain correcting circuit (1209), thereby enabling correction of the right-and-left gain difference Hereinbelow, a processing flow of the second embodiment will be described.

Figure 11:
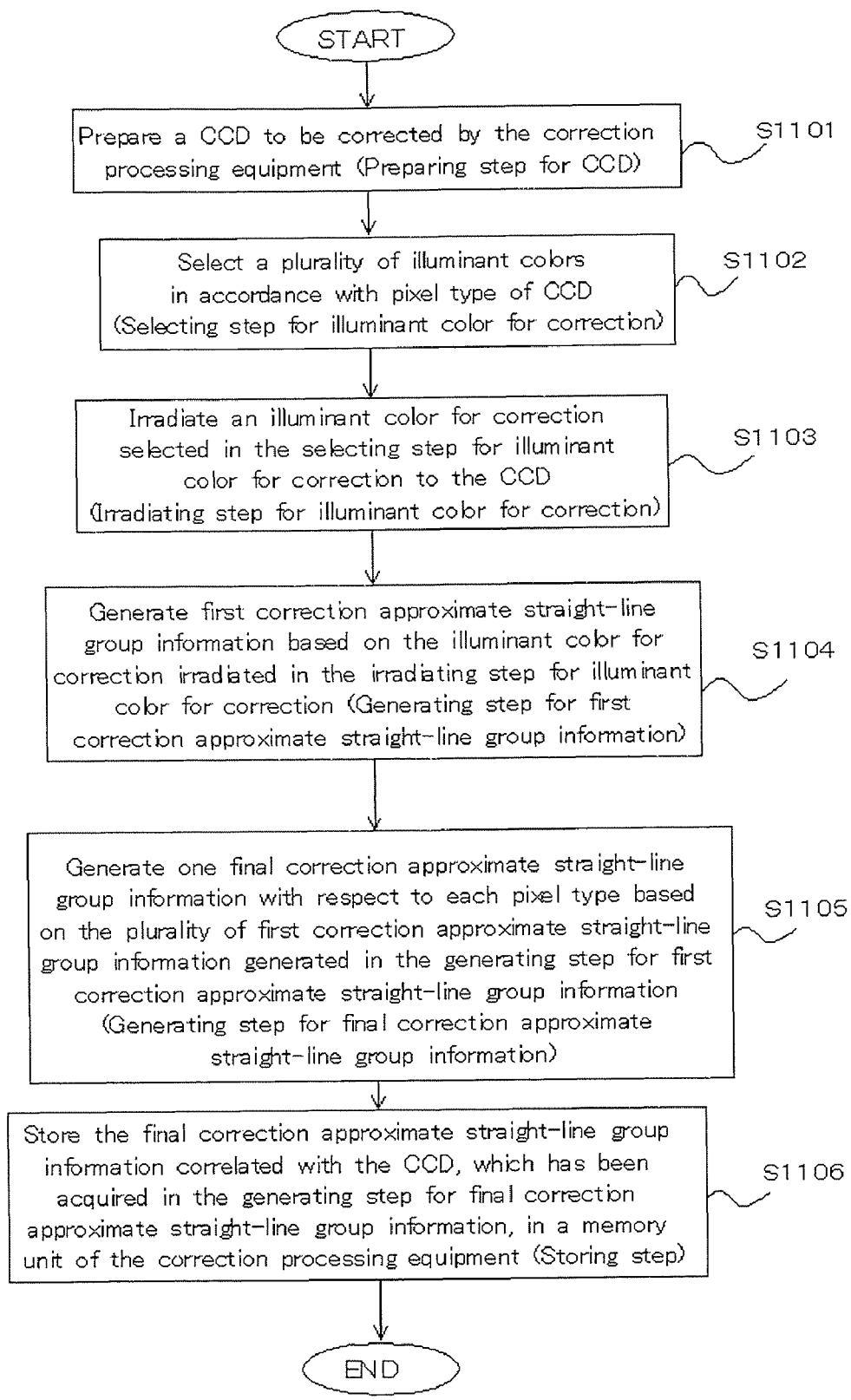
FIG. 11 is a flow chart of a second embodiment.

FIG. 11 is a flow chart of the second embodiment.

In the manufacturing method for correction processing equipment for multi-segment reading CCD, at the outset, a preparing step for CCD (step S1101) prepares a CCD to be corrected by the correction processing equipment. Subsequently, a selecting step for illuminant color for correction selects a plurality of illuminant colors in accordance with said pixel type of CCD (step S1102). Subsequently, an irradiating step for illuminant color for correction irradiates a illuminant color for correction selected in said selecting step for illuminant color for correction to said CCD (step S1103). Subsequently, a generating step for first correction approximate straight-line group information generates first correction approximate straight-line group information based on the illuminant color for correction irradiated in said irradiating step for illuminant color for correction (step S1104). Subsequently, a generating step for final correction approximate straight-line group information generates one final correction approximate straight-line group information with respect to each pixel type based on the plurality of first correction approximate straight-line group information generated in said generating step for first correction approximate straight-line group information (step S1105). Subsequently, a storing step stores the final correction approximate straight-line group information correlated with said CCD, which has been acquired in said generating step for final correction approximate straight-line group information, in a memory unit of the correction processing equipment (step S1106).

According to the method and an apparatus for generating correction approximate straight-line group information for multi-segment reading CCD, it becomes possible to generate a plurality of first correction approximate straight-line group information with respect to each apparatus. The best one final correction approximate straight-line group information is generated from the generated plurality of first correction approximate straight-line group information. Therefore, as to all pixels, it becomes possible to carry out correction with respect to each pixel type by means of the one final correction approximate straight-line group information upon photographing.

INDUSTRIAL APPLICABILITY

The present invention is applicable to a method and an apparatus for generating correction approximate straight-line group information for multi-segment reading CCD, and a method and an apparatus for manufacturing correction processing equipment for multi-segment reading CCD.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manufacturing method for correction processing equipment for multi-segment reading CCD, which is for correcting an output value for pixel acquired based on an output in accordance with a pixel type of the multi-segment reading CCD, comprising:
   a preparing step for the multi-segment reading CCD, which prepares the multi-segment reading CCD to be corrected by the correction processing equipment;
   a selecting step for illuminant color for correction, which selects a plurality of illuminant colors in accordance with said pixel type of the multi-segment reading CCD;
   an irradiating step for illuminant color for correction, which irradiates a illuminant color for correction selected in said selecting step for illuminant color for correction to said multi-segment reading CCD;
   a generating step for first correction approximate straight-line group information, which generates first correction approximate straight-line group information based on the illuminant color for correction irradiated in said irradiating step for illuminant color for correction;
   a generating step for final correction approximate straight-line group information, which generates one final correction approximate straight-line group information with respect to each said pixel type based on the plurality of first correction approximate straight-line group information generated in said generating step for first correction approximate straight-line group information; and
   a storing step, which stores the final correction approximate straight-line group information correlated with said multi-segment reading CCD, which has been acquired in said generating step for final correction approximate straight-line group information, in a memory unit of the correction processing equipment.

2. A manufacturing apparatus for correction processing equipment for multi-segment reading CCD, which is for correcting an output value for pixel acquired based on an output in accordance with a pixel type of the multi-segment reading, comprising:
   a preparing unit for the multi-segment reading CCD, which prepares the multi-segment reading CCD to be corrected by the correction processing equipment;
   a selecting unit for illuminant color for correction, which selects a plurality of illuminant colors in accordance with said pixel type of the multi-segment reading CCD;

an irradiating unit for illuminant color for correction, which irradiates a illuminant color for correction selected by said selecting unit for illuminant color for correction to said multi-segment reading CCD;

a generating unit for first correction approximate straight-line group information, which generates first correction approximate straight-line group information based on the illuminant color for correction irradiated by said irradiating unit for illuminant color for correction;

a generating unit for final correction approximate straight-line group information, which generates one final correction approximate straight-line group information with respect to each said pixel type based on the plurality of first correction approximate straight-line group information generated by said generating unit for first correction approximate straight-line group information; and a storing unit, which stores the final correction approximate straight-line group information correlated with said multi-segment reading CCD, which has been acquired by said generating unit for final correction approximate straight-line group information, into the correction processing equipment.

* * * * *